Figures 1, 2:
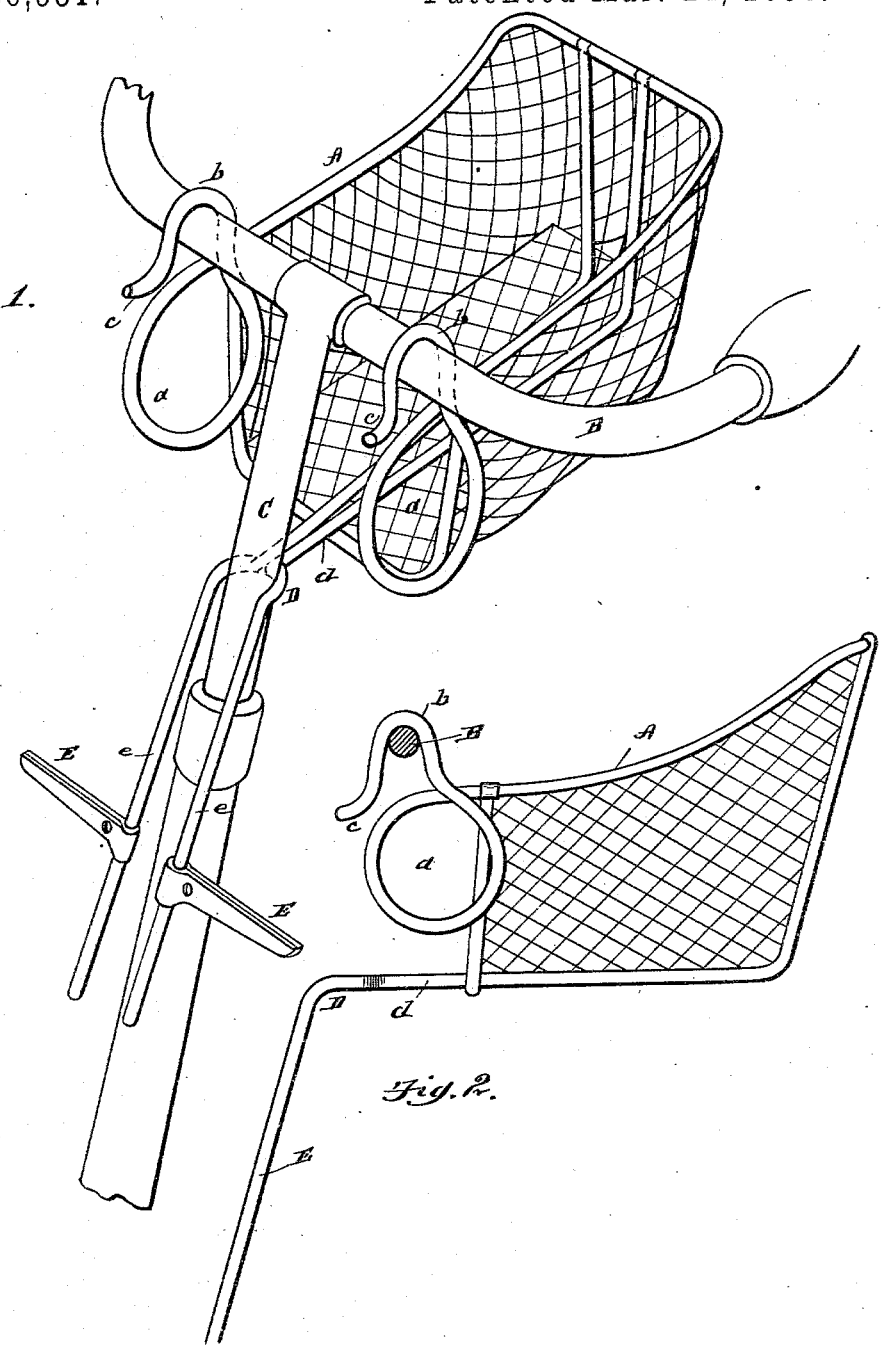

(No Model.)

C. D. WILLIAMS & J. H. ELLIOTT.
CHILD'S SEAT FOR BICYCLES.

No. 556,951. Patented Mar. 24, 1896.

WITNESSES

INVENTORS

Charles D. Williams
Joseph H. Elliott
By Parker & Burton
Attorneys.

UNITED STATES PATENT OFFICE.

CHARLES D. WILLIAMS, OF DETROIT, MICHIGAN, AND JOSEPH H. ELLIOTT, OF WINDSOR, CANADA.

CHILD'S SEAT FOR BICYCLES.

SPECIFICATION forming part of Letters Patent No. 556,951, dated March 24, 1896.

Application filed April 8, 1895. Serial No. 544,939. (No model.)

*To all whom it may concern:*

Be it known that we, CHARLES D. WILLIAMS, a citizen of Canada, residing at Detroit, in the county of Wayne and State of Michigan, and JOSEPH H. ELLIOTT, a citizen of the United States, residing at Windsor, county of Essex, Province of Ontario, Canada, have invented a certain new and useful Improvement in Children's Seats for Bicycles; and we declare the following to be a full, clear, and exact description of the invention, such as will enable others skilled in the art to which it pertains to make and use the same, reference being had to the accompanying drawings, which form a part of this specification.

This invention relates to a child's seat for bicycles, and has for its object a seat that is light, convenient, easily attachable and detachable from the bicycle, and one that while attached is held securely in place without danger of accidental displacement, but which can be attached readily with the child in it by simply hooking it in place.

In the drawings, Figure 1 shows in perspective the seat in place on the handle-bar and handle-post of the bicycle. Fig. 2 shows a side elevation of the seat.

The seat proper consists of a basket of any suitable material (preferably of woven wire) having a bottom and three sides, which form the bottom, two sides, and back of the seat, while the fourth side of what would usually be the basket is omitted to furnish suitable provision for the projecting limbs of the child.

The seat consists essentially of the upper frame-piece A, which forms the upper rim of the basket and at its forward ends bends in a curve $a$ on itself and is provided near the extreme ends with the hooks $b$, that are adapted to engage over the handle-bar B of the bicycle. The extreme end $c$ of the hook $b$ is turned in so closely to the wire of the curve $a$ that it is necessary to spring the end $c$ away from the curve $a$ when the seat is placed in position. This spring action is automatically produced from the shape of the parts through the weight carried in the seat.

From front to rear across the bottom of the basket or seat extend the brace-rods $d$ $d$. In the drawings there are two such brace-rods shown united or bound together immediately behind the post C and diverging both at the rear side and at the front side of the place where they are bound together, the divergence at the front side being an abrupt Y-shaped fork, which embraces the post C, and the two parts of the fork turn abruptly downward in the branches $e$ $e$, furnishing supports for the foot-rests E E.

The divergence at the rear of the place where the two braces are united is not a material feature, and in fact the brace might be made of a single piece of metal split at the front fork.

The tendency of the weight in the seat is to pull downward and backward on the hooks $b$ and to press forward at the fork D against the handle-post C.

This seat is secured to the bicycle without any other appliance than those shown in the drawings, and requires neither straps, buckles, nor screw-secured clamps, and it is apparent that the child may be seated in the seat while it is detached from the bicycle-frame, and the seat, with the child in it, lifted to position and secured in place by engaging the hooks $b$ over the bar and the fork in position against the back of the bar.

What we claim is—

1. In a child's seat for bicycles, the combination of a seat provided with hooks adapted to hold its upper forward edge to the bicycle-handle and a brace projecting forward from the seat and adapted to engage the handle-post at the rear thereof, substantially as described.

2. In a child's seat for bicycles, the combination of a basket-seat, provided with spring-hooks adapted to engage the handle-bar, a forked brace extending forward from the seat and adapted to engage the rear of the handle-posts, and foot-rests supported from the forked brace, substantially as described.

3. In a child's seat for bicycles, the combination of the seat provided with hooks adapted to hold its upper, forward edge, to the bicycle handle-bar, and a brace projecting forward from the bottom of said seat and adapted to engage the handle-post at the rear thereof, substantially as described.

4. In a child's seat for bicycles, the combination of a basket-seat having its upper edge terminate at the two forward ends with the curves $a$: spring-hooks $b$, $b$, formed by bending the ends of said curves, the brace-rods $d$, $d$, secured to the bottom of said seat and extending forward to the rear of said handle-post, and foot-rests supported from said brace-rods, substantially as described.

In testimony whereof we sign this specification in the presence of two witnesses.

CHARLES D. WILLIAMS.
JOSEPH H. ELLIOTT.

Witnesses:
J. M. CLOUGH,
FRANCES CLOUGH.